(12) United States Patent
Miyata

(10) Patent No.: US 8,607,015 B2
(45) Date of Patent: Dec. 10, 2013

(54) ONBOARD SYSTEM FOR VEHICLE

(75) Inventor: Kazuo Miyata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 283 days.

(21) Appl. No.: 12/997,366

(22) PCT Filed: May 14, 2009

(86) PCT No.: PCT/JP2009/002118
§ 371 (c)(1),
(2), (4) Date: Dec. 10, 2010

(87) PCT Pub. No.: WO2010/016172
PCT Pub. Date: Feb. 11, 2010

(65) Prior Publication Data
US 2011/0093678 A1    Apr. 21, 2011

(30) Foreign Application Priority Data
Aug. 5, 2008   (JP) .................................. 2008-202184

(51) Int. Cl.
*G06F 12/00*   (2006.01)
*G11B 19/02*   (2006.01)

(52) U.S. Cl.
USPC .................................. 711/166; 711/E12.001

(58) Field of Classification Search
USPC ............................ 711/114, 105, 302, E12.002
See application file for complete search history.

(56) References Cited

U.S. PATENT DOCUMENTS

| | | | |
|---|---|---|---|
| 6,714,376 B1 * | 3/2004 | Brunnett et al. ................. | 360/75 |
| 6,760,846 B1 | 7/2004 | Yoshida et al. | |
| 7,006,418 B1 | 2/2006 | Matsuda | |
| 2006/0133476 A1 * | 6/2006 | Page et al. ................. | 375/240.01 |
| 2006/0203628 A1 * | 9/2006 | Komma et al. ............. | 369/44.25 |
| 2007/0282521 A1 * | 12/2007 | Broughton .................... | 701/200 |
| 2008/0043579 A1 | 2/2008 | Shigeta | |
| 2009/0315667 A1 * | 12/2009 | Kawamura et al. ............ | 340/3.1 |

FOREIGN PATENT DOCUMENTS

| | | |
|---|---|---|
| JP | 62-47758 A | 3/1987 |
| JP | 3-147532 A | 6/1991 |
| JP | 6-36441 A | 2/1994 |
| JP | 2000-293923 A | 10/2000 |
| JP | 2001-14781 A | 1/2001 |
| JP | 2003-323392 A | 11/2003 |
| JP | 2007-536692 A | 12/2007 |
| WO | WO 2005/106860 A1 | 11/2005 |
| WO | WO 2005/119666 A1 | 12/2005 |

* cited by examiner

*Primary Examiner* — Mardochee Chery
(74) *Attorney, Agent, or Firm* — Birch, Stewart, Kolasch & Birch, LLP

(57) ABSTRACT

A control unit (main CPU 10 of a head unit 1) of an onboard system decides as to whether an issuing condition of an initialization command set and stored in a storage unit is satisfied at an initial start after the assembly of a portable storage device (DVD drive 20) or at an initial start after mounting the device in a vehicle, and transmits the initialization command to the portable storage device when satisfied.

9 Claims, 9 Drawing Sheets

FIG.10

|  | Management Flag | Default Value | At Reset |
|---|---|---|---|
| (1) At Initial Start after Assembly of DVD Drive | Flag A | ON | ON |
| (2) At Initial Start after Mounting DVD Drive | Flag B | ON | ON |
| (3) At Initial Start When Removing Head Unit, Followed by Starting It outside, and Mounting It Again | Flag C | OFF | OFF |
| (4) At Initial Start after Power Is Turned off before System Shutdown | Flag D | OFF | OFF |
| (5) At Initial Start after Vehicle Position Varies in Inactive State | Flag E | OFF | OFF |
| (6) At Initial Start after Temperature/ Humidity Goes beyond Safe Range | Flag F | OFF | OFF |

ONBOARD SYSTEM FOR VEHICLE

TECHNICAL FIELD

The present invention relates to an onboard system comprising onboard information equipment having a portable storage device such as a DVD (Digital Versatile Disc) drive mounted thereon and external equipment connected to the onboard information equipment via a serial communication channel such as a CAN (Control Area Network).

BACKGROUND ART

As for onboard information equipment (referred to as a head unit from now on), it can carry out besides navigation functions various video and audio processing providing rich entertainments for occupants in the car to have a pleasant time. In addition, it has become increasingly common to mount a plurality of AV (Audio Visual) devices in the vehicle for playing back video and audio sources. For this reason, DVDs become essential as a video playback source.

In a DVD drive, however, it sometimes occurs in a state in which power is not supplied that a working part such as a pickup or spindle slips out of a default position owing to vibration or impact peculiar to a vehicle. For this reason, it is necessary to perform initialization operation (correction to the default position) for ensuring of the DVD drive at its start.

The initialization operation mentioned above is usually managed by flags assigned to prescribed areas (flag areas) of a nonvolatile memory the foregoing head unit has. For example, as for a storage device (semiconductor memory, optical disk, or magnetic disk) requiring initialization, a storage device has been conventionally known which enables a host system (mobile terminal) to perform the initialization easily and which can prevent unnecessary rewriting of initialization information (see Patent Document 1, for example).

PRIOR ART DOCUMENT

Patent Document

Patent Document 1: Japanese Patent Laid-Open No. 2003-323392.

As to the occurrence of a problem about displacement of the working parts of the DVD drive due to the vibration or impact, it is assumed to occur during assembling in a line process, during transport or during mounting in the vehicle. Thus, at a start immediately thereafter, initialization operation is required for correcting the working parts controlled by the servo system to the default positions in particular.

However, if the initialization operation of the working parts of the DVD drive is carried out each time at the start, unpleasant mechanical sound will occur during position adjustment for correction to the default position. This will cause a user to hear the sound every time, which is undesirable. The sound also occurs when the navigation or a radio set which is an application having nothing to do with the working parts of the DVD drive is started. This will result in a feeling of displeasure or a sense of discomfort of the user.

The present invention is implemented to solve the foregoing problems. Therefore it is an object of the present invention to provide an onboard system capable of preventing a user from having a feeling of displeasure or a sense of discomfort by suppressing the occurrence of the mechanical sound by limiting the occasion of carrying out the initialization operation as much as possible.

DISCLOSURE OF THE INVENTION

To solve the foregoing problems, an onboard system in accordance with the present invention is an onboard system including onboard information equipment in which a portable storage device is mounted and external equipment connected to the onboard information equipment via a serial communication channel, the onboard system comprising: a storage unit for setting and storing issuing conditions of an initialization command for position adjustment of a working part of the portable storage device; and a control unit for making a decision at an initial start after assembly of the portable storage device as to whether an issuing condition of the initialization command set and stored in the storage unit is satisfied and for transmitting, when satisfied, the initialization command to the portable storage device, and for making a decision at an initial start after mounting it in the vehicle as to whether an issuing condition of the initialization command set and stored in the storage unit is satisfied and for transmitting, when satisfied, the initialization command to the portable storage device.

According to the onboard system in accordance with the present invention, it can avoid giving a user a feeling of displeasure or a sense of discomfort by suppressing occurrence of the mechanical sound by limiting the occasion of carrying out the initialization operation as much as possible.

BRIEF DESCRIPTION OF THE DRAWINGS

FIG. 10 is a diagram showing in a table relationships between initialization command issuing conditions and flags used in the onboard system of the embodiment 1 in accordance with the present invention.

BEST MODE FOR CARRYING OUT THE INVENTION

The best mode for carrying out the invention will now be described with reference to the accompanying drawings to explain the present invention in more detail.

Embodiment 1

Figure 1:
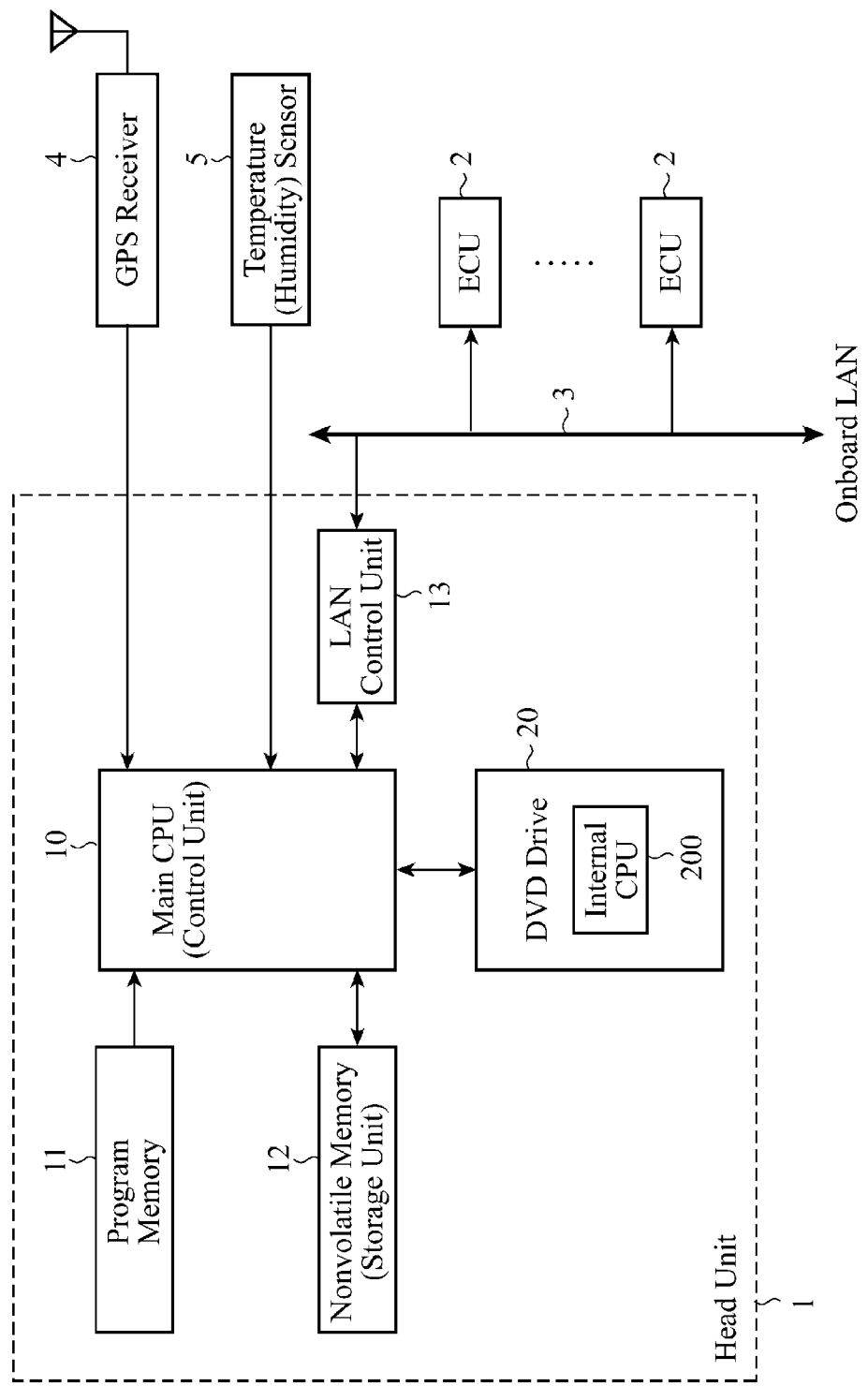
FIG. 1 is a block diagram showing a system configuration of an onboard system of an embodiment 1 in accordance with the present invention.

FIG. 1 is a block diagram showing a configuration of an onboard system of the embodiment 1 in accordance with the present invention. As shown in FIG. 1, the onboard system of the embodiment 1 in accordance with the present invention comprises a head unit 1 which is onboard information equipment having a DVD drive 20 mounted thereon as a portable storage device, and a plurality of ECUs (electronically controlled units) 2 which serve as external equipment and are connected to the head unit 1 via an onboard LAN (Local Area Network) 3 working as a serial communication channel.

Incidentally, to the ECUs 2, sensors fixed to various portions of the vehicle including its power train like an engine, or electrical components such as an air conditioner are connected. The head unit 1 can acquire vehicle information containing a vehicle identification number (VIN) via the plurality of ECUs 2 and an onboard LAN such as a CAN (Controller Area Network) which is developed by Robert Bosch GmbH in Germany and is internationally standardized by ISO.

To the head unit 1, external devices such as a GPS receiver 4 and a temperature (humidity) sensor 5 are connected. The GPS receiver 4 receives signals for positioning its own vehicle from GPS satellites not shown, and the temperature (humidity) sensor 5 measures ambient temperature or humidity of the vehicle, and they supply them to the head unit 1.

The head unit 1 measures the vehicle's own position from the signals the GPS receiver 4 receives, and generates information about the latitude, longitude and time. In addition, it makes a decision from the information measured with the temperature (humidity) sensor 5 as to whether it is within a range where the vehicle system can operate normally.

The head unit 1 has as a control center a main CPU 10 for successively reading and executing a program stored in a program memory 11. To the main. CPU 10, not only the DVD drive 20 is connected via a serial (parallel) ATA (AT Attachment) or a USB (Universal Serial Bus) interface, but also a nonvolatile memory 12 like a flash memory and a LAN control unit 13 are connected via an internal bus. The LAN control unit 13 controls the interface with an onboard LAN 3 according to a serial communication protocol.

Incidentally, the nonvolatile memory 12 operates as "a storage unit for setting and storing issuing conditions of an initialization command for carrying out position adjustment of working parts of the portable storage device (DVD drive 20)"; and the main CPU 10 operates as "a control unit for making a decision at an initial start after assembling the portable storage device as to whether the issuing condition of the initialization command set and stored in the storage unit is satisfied, and for transmitting, if satisfied, the initialization command to the portable storage device, and for making a decision at an initial start after mounting the portable storage device in the vehicle as to whether the issuing condition of the initialization command set and stored in the storage unit is satisfied, and for transmitting, if satisfied, the initialization command to the portable storage device". Its details will be described later.

On the other hand, the DVD drive 20 includes a CPU (internal CPU 200), and the internal CPU 200 controls the working parts of the DVD drive 20 by executing various commands (read/write) including the initialization command transmitted from the main CPU 10.

Specifically, the internal CPU 200 receives a format command from the main CPU 10 to perform format control of the DVD, and receives the initialization command or read/write command to perform tracking and focusing of the pickup and servo control of the actuator and spindle motor, which are working parts.

Here, the execution conditions of the initialization operation of the onboard system of the embodiment 1 in accordance with the present invention and their effectiveness will be described briefly.

As cases for the head unit 1 to transmit the initialization command to the DVD drive 20 to perform the initialization operation for returning the working parts to the default positions, it is assumed that they are limited to the following cases (1)-(6). As for the other cases, since they do not involve the initialization operation of the working parts of the DVD drive 20, the occurrence frequency of the mechanical sound reduces greatly. Accordingly, occasions of giving a user a feeling of displeasure or a sense of discomfort due to the mechanical sound become a minimum necessary.

(1) At Initial Start After Assembling DVD Drive 20.

Since the head unit 1 has some variations in the assembly accuracy in a line process, the working parts of the DVD drive 20 to be mounted can sometimes deviate from the default positions. Accordingly, it is effective in this case to perform the initialization operation at the initial start after the assembly.

(2) At Initial Start After Mounting Head Unit 1 in Vehicle.

When the head unit 1 is mounted in the vehicle, it is likely that the working parts of the DVD drive 20 can deviate from the default positions owing to vibration or impact because they must be transported before that. Accordingly, it is effective in this case to perform the initialization operation when receiving receivable vehicle information via the onboard LAN 3 at the initial start after mounting in the vehicle.

(3) When Removing Head Unit 1 from Vehicle, Followed by Starting Removed Head Unit 1 Outside Vehicle and by Mounting in Vehicle Again.

When the head unit 1 is removed once from the vehicle, and is mounted in the vehicle again after being started and repaired outside the vehicle for maintenance, inspection, repair or the like, it is likely that the working parts of the DVD drive 20 can deviate from the default positions because of vibration, impact or the like. For this reason, it is effective to perform the initialization operation when mounting the head unit 1 passing through the removal and maintenance inspection work in the vehicle again.

(4) When Power Supply Is Switched off Before System Shutdown.

If the power supply (battery) to the head unit 1 is turned off before a system shutdown, it is likely that the working parts of the DVD drive 20 deviate from the default positions at the next start. Accordingly, it is effective to perform the initialization operation at the next start. Incidentally, in Windows (registered trademark), for example, the term "shutdown" refers to switching off the power supply or restarting after completing normal termination processing of saving the internal state in registers and the like by selecting the shutdown option in the start menu.

(5) When Vehicle Position Varies in Inactive State.

When the head unit 1 is transported together with the vehicle in a ferryboat or the like in a system-off state, it is likely that the working parts of the DVD drive 20 can deviate from the default positions owing to vibration or impact. Accordingly, it is effective to perform the initialization operation at the next start.

(6) If Temperature or Humidity Goes Beyond Safe Operation Range of DVD Drive 20.

If the temperature or humidity goes beyond the safe operation range of the DVD drive 20, the operation of the DVD drive 20 is not guaranteed. Thus, even if the temperature or humidity returns within the safe operation range of the DVD drive 20 at the next start, it is likely that the working parts deviate from the default positions. Accordingly, it is effective to perform the initialization operation at the next start.

Figure 2:
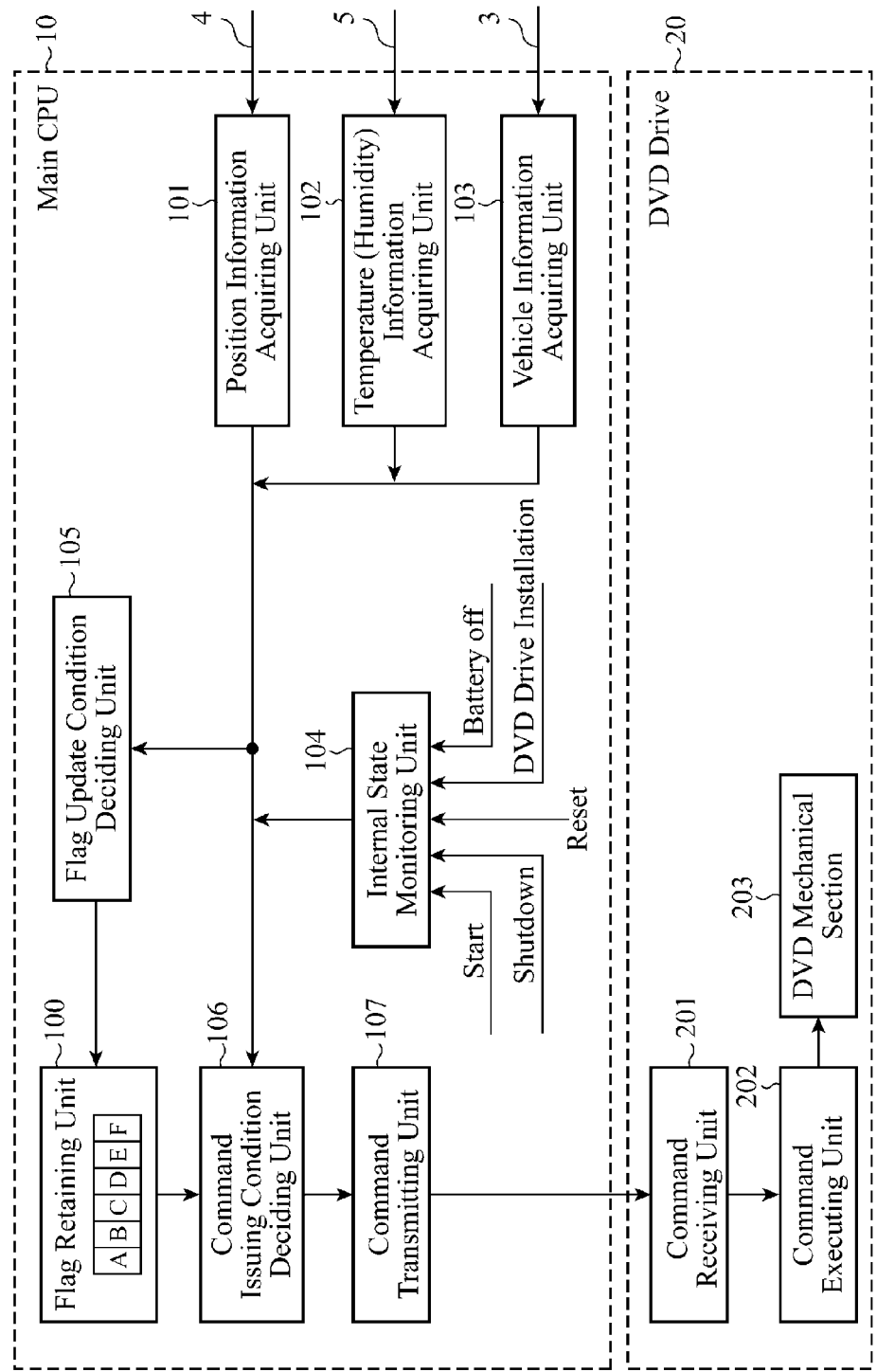
FIG. 2 is a block diagram showing a structure of a program executed by the main CPU in the head unit of the onboard system of the embodiment 1 in accordance with the present invention and by the internal CPU of a DVD drive with functions of the program being developed.

FIG. 2 is a block diagram showing a structure of the program, which the main CPU 10 and the internal CPU 200 of the DVD drive 20 shown in FIG. 1 execute, with functions of the program being developed.

As shown in FIG. 2, the program the main CPU 10 executes comprises a flag retaining unit 100, a position information acquiring unit 101, a temperature (humidity) information acquiring unit 102, a vehicle information acquiring unit 103, an internal state monitoring unit 104, a flag update condition deciding unit 105, a command issuing condition deciding unit 106 and a command transmitting unit 107.

The flag retaining unit 100 keeps the issuing conditions of the initialization command for the foregoing cases (1)-(6), respectively. They are retained as a flag A (first flag), a flag B (second flag), a flag C (third flag), a flag D (fourth flag), a flag E (fifth flag), and a flag F (sixth flag).

The flag A-flag F kept in the flag retaining unit 100 are actually assigned to and stored in the flag areas of the nonvolatile memory 12 shown in FIG. 1. FIG. 10 shows in a table the state transition behavior of the flag A-flag F of the foregoing cases (1)-(6) as a state transition diagram. The details will be described later.

The position information acquiring unit 101 acquires a result of measuring the position from the signals the GPS receiver 4 receives, and delivers to the flag update condition deciding unit 105 and command issuing condition deciding unit 106. The temperature (humidity) information acquiring unit 102 generates temperature (humidity) information from the signal measured with the temperature (humidity) sensor 5, and delivered to the flag update condition deciding unit 105 and command issuing condition deciding unit 106.

The vehicle information acquiring unit 103 delivers the vehicle information such as about VIN or the vehicle speed and distance traveled it receives via the plurality of ECUs 2, the onboard LAN 3 and the LAN control unit 13 to the flag update condition deciding unit 105 and command issuing condition deciding unit 106.

The internal state monitoring unit 104 continuously monitors operation events based on the operation of a user such as start, shutdown and reset, or the internal states such as the mounting state of the head unit 1 and battery off, and delivers the contents to the flag update condition deciding unit 105.

As to each of the flag A-flag F whose default values are set in the flag retaining unit 100, the flag update condition deciding unit 105 updates each value of the flag A-flag F by making a flag update decision according to a combination of the internal state information output from the internal state monitoring unit 104 and the external state information delivered from the position information acquiring unit 101, temperature (humidity) information acquiring unit 102 and vehicle information acquiring unit 103.

The flag update condition deciding unit 105 carries out control of switching on a relevant flag of the flag A-flag F in the flag retaining unit 100 taking the opportunity of the event detection by the internal state monitoring unit 104 such as start detection, shutdown detection, reset detection, battery off detection, installation detection of the head unit 1, the vehicle movement detection of a prescribed distance like 500 m in an inactive state, and the detection of the temperature or humidity that exceeds the operation allowable range. In addition, as to the individual cases (1)-(6) described above, the flag update condition deciding unit 105 carries out control of returning the value of the relevant flag A-flag F to the default value at the timing when the command issuing condition deciding unit 106, which will be described below, makes a decision that the initialization command issuing condition is satisfied, and when the command transmitting unit 107 transmits the initialization command to the DVD drive 20.

Incidentally, at the initial start after the reset processing, the flag update condition deciding unit 105 can return the value at least one of the flag A to flag F indicates to the default value before the update.

The command issuing condition deciding unit 106 decides as to each of the cases (1)-(6) described above the issuing condition of the initialization command according to a combination of the values of the flag A-flag F obtained by referring to the flag retaining unit 100 and the external state information delivered from the position information acquiring unit 101, temperature (humidity) information acquiring unit 102, and vehicle information acquiring unit 103, and controls the command transmitting unit 107.

For example, when the flag A (first flag) set in the flag area of the nonvolatile memory 12 is in the ON state at the initial start after the assembly of the DVD drive 20, the command issuing condition deciding unit 106 decides that the initialization command issuing condition is satisfied, and controls the command transmitting unit 107. In addition, when the flag B (second flag) set in the flag area of the nonvolatile memory 12 is in the ON state at the initial start after mounting the DVD drive 20 in the vehicle, and when receiving the VIN from the vehicle information acquiring unit 103, the command issuing condition deciding unit 106 decides that the issuing condition of the initialization command is satisfied, and controls the command transmitting unit 107.

Concerning the case where the head unit 1 is once removed from the vehicle, followed by starting the removed head unit 1 outside the vehicle and returning it in the vehicle again, if the flag C (third flag) set in the flag area of the nonvolatile memory 12 is in the ON state and when receiving the VIN via the vehicle information acquiring unit 103, the command issuing condition deciding unit 106 decides that the issuing condition of the initialization command is satisfied and controls the command transmitting unit 107.

In addition, in the case where the command issuing condition deciding unit 106 detects that the power supply is turned off before a shutdown in which the value of the flag D (fourth flag) is updated, it decides if the flag D is in the ON state that the initialization command issuing condition is satisfied, and controls the command transmitting unit 107.

At the initial start after the command issuing condition deciding unit 106 makes a decision that the vehicle moves more than a prescribed distance by comparing, at a start, the vehicle's own position before the preceding shutdown with the vehicle's own position at the current start, the command issuing condition deciding unit 106 decides, if the flag E (fifth flag) is in the ON state in the condition where the head unit 1 is not supplied with power, that the initialization command issuing condition is satisfied and controls the command transmitting unit 107.

In addition, at the initial start after detecting that at least one of the ambient temperature and humidity exceeds the operation allowable range in the normal operation, if the flag F (sixth flag) is in the ON state in the case where the recovery of the state is informed via the temperature (humidity) information acquiring unit 102, the command issuing condition deciding unit 106 makes a decision that the initialization command issuing condition is satisfied and controls the command transmitting unit 107.

On the other hand, a program the internal CPU 200 of the DVD drive 20 executes comprises a command receiving unit 201 and a command executing unit 202 as shown in FIG. 2.

The command receiving unit 201 receives the initialization command transmitted from the main CPU 10 and the command executing unit 202 executes the initialization command, thereby making the position adjustment of each working part of a DVD mechanical section 203 to the default position. Here, the DVD mechanical section 203 refers to the working parts that are connected to input/output ports controlled by the internal CPU 200, that are controlled by a servo system such as the actuator (DC motor) of a pickup, a spindle motor and the like, and that require position adjustment at the initialization operation.

FIG. 3-FIG. 9 are flowcharts showing the operation of the onboard system of the embodiment 1 in accordance with the present invention.

Referring to the flowcharts of FIG. 3-FIG. 9, the operation of the onboard system of the embodiment 1 in accordance with the present invention shown in FIG. 1 and FIG. 2 will be described in detail below for the individual cases (1)-(6) described above.

First, (1) the operation of the onboard system at the initial start after the assembly of the DVD drive 20 will be described. It is assumed here as shown in the relationships between the initialization command issuing condition and the flags of FIG. 10 that both the flag A and flag B in the flag retaining unit 100 hold the default value "ON", and the flag C, flag D, flag E and flag F each hold the default value "OFF".

At the initial start after the assembly of the DVD drive 20 (step ST301 of FIG. 3), the command issuing condition deciding unit 106 refers to the value of the flag A in the flag retaining unit 100 first (step ST302), and controls, if it is set ON ("YES" at step ST302), the command transmitting unit 107 to transmit the initialization command to the DVD drive 20 (step ST303).

In this case, receiving the initialization command transmitted from the head unit 1 with the command receiving unit 201 via the serial (parallel) ATA or USE, the DVD drive 20 has the command executing unit 202 execute the initialization command, thereby executing the initialization operation for the position adjustment of the working parts the DVD mechanical section 203 possesses.

After the initialization operation has been executed, the flag update condition deciding unit 105 sets the flag A in the OFF state by controlling the flag retaining unit 100 (step ST304). After that, the head unit 1 makes a transition to the normal system operation (step ST305), and executes "system shutdown processing" shown by the flowchart G in FIG. 9.

In the "system shutdown processing", if the internal state monitoring unit 104 detects that the information about the ambient temperature or humidity acquired by the temperature (humidity) information acquiring unit 102 goes beyond the safe range of the DVD drive 20 ("YES" at step ST901), the flag update condition deciding unit 105 executes the processing of setting the flag F to the ON state by controlling the flag retaining unit 100 (step ST902). In contrast, if it operates within the safe range ("NO" at step ST901), the flag update condition deciding unit 105 executes the processing of returning the flag D to the OFF state which is the default value by controlling the flag retaining unit 100 (step ST903) to bring to the system shutdown (step ST904).

Figure 3:
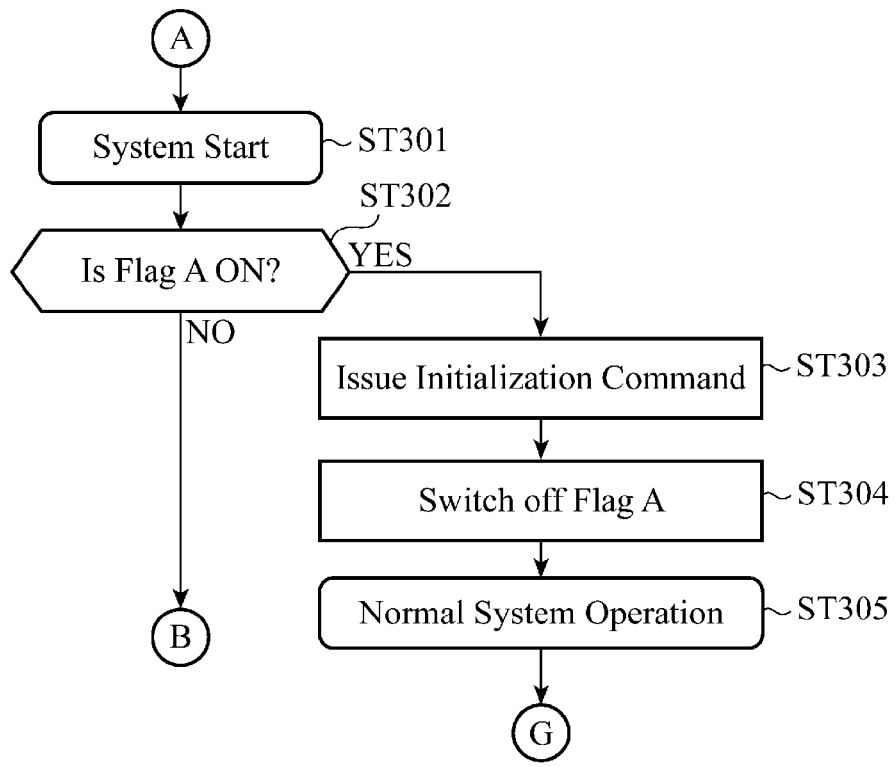
FIG. 3 is a flowchart showing the operation of case (1) of the onboard system of the embodiment 1 in accordance with the present invention.
Figure 4:
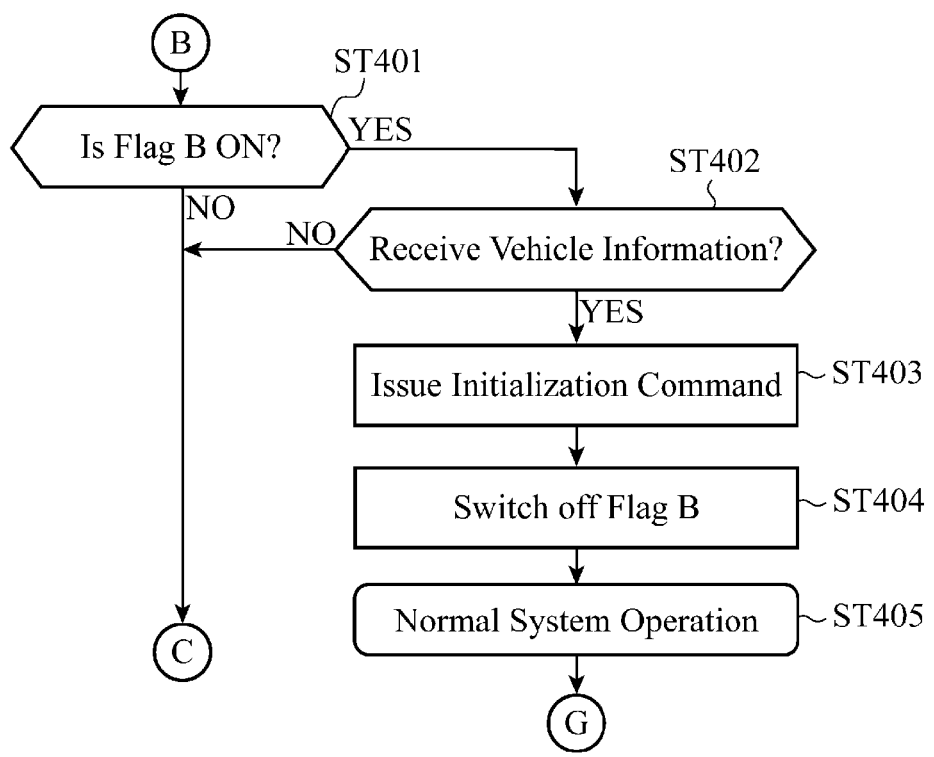
FIG. 4 is a flowchart showing the operation of case (2) of the onboard system of the embodiment 1 in accordance with the present invention.

On the other hand, if the flag A is in the OFF state in the flag A decision processing at step ST302 of FIG. 3 ("NO" at ST302), the head unit 1 proceeds to (2) processing at the initial start after mounting the head unit 1 in the vehicle shown in the flowchart B in FIG. 4.

Here, the command issuing condition deciding unit 106 refers to the value of the flag B in the flag retaining unit 100 first (step ST401), and if the flag B is set ON ("YES" at step ST401), then further waiting for receiving the VIN acquired by the vehicle information acquiring unit 103 ("YES" at step ST402), it controls the command transmitting unit 107 to transmit the initialization command to the DVD drive 20 (step ST403). In this case, the flag update condition deciding unit 105 carries out the control of setting the flag B in the OFF state by controlling the flag retaining unit 100 (step ST404), followed by making transition to the normal system operation (step ST405).

Figure 5:
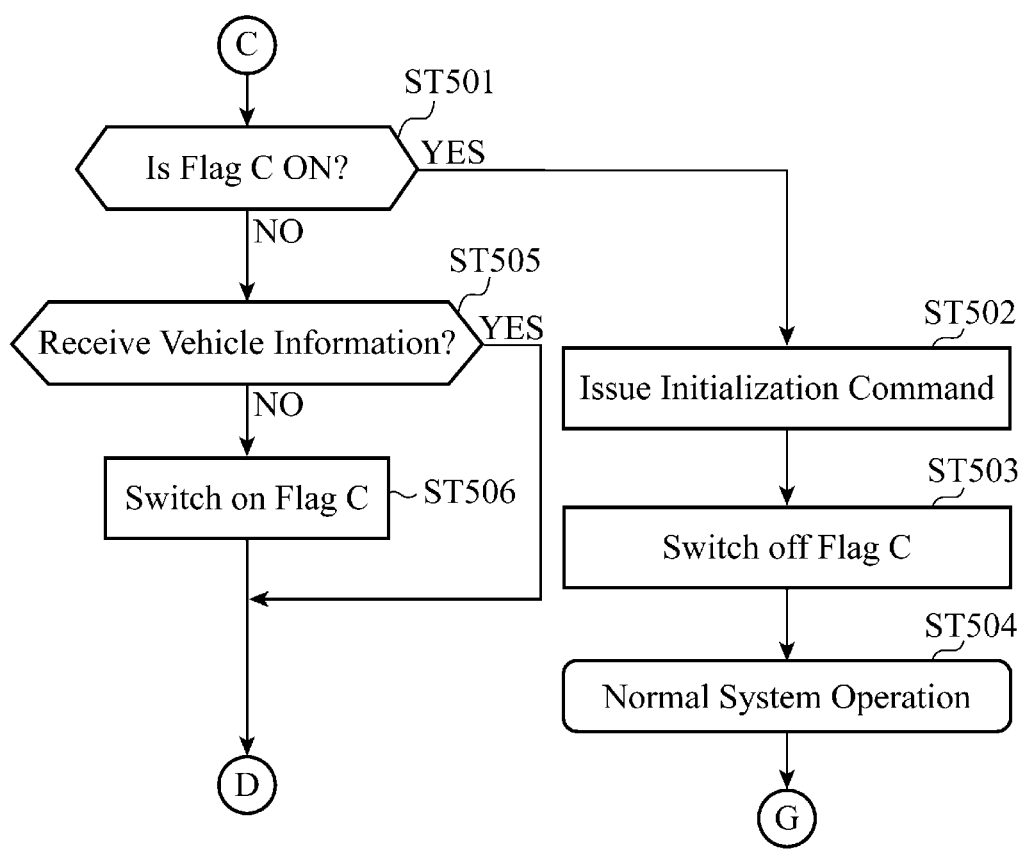
FIG. 5 is a flowchart showing the operation of case (3) of the onboard system of the embodiment 1 in accordance with the present invention.

On the other hand, if the flag B is in the OFF state in the flag B decision processing at step ST401 of FIG. 4 ("NO" at step ST401), the head unit 1 proceeds to (3) processing when the head unit 1 is removed from the vehicle, followed by starting the removed head unit 1 outside the vehicle, and by mounting it on the vehicle again, which is shown by the flowchart C in FIG. 5.

Here, the command issuing condition deciding unit 106 refers to the value of the flag C in the flag retaining unit 100 (step ST501). If the flag C is set ON here ("YES" at step ST501), the command issuing condition deciding unit 106 controls the command transmitting unit 107 to transmit the initialization command to the DVD drive 20 (step ST502). In this case, the flag update condition deciding unit 105 carries out the control of returning the flag C to the OFF state which is the default value by controlling the flag retaining unit 100 (step ST503), followed by making a transition to the normal system operation (step ST504).

Figure 6:
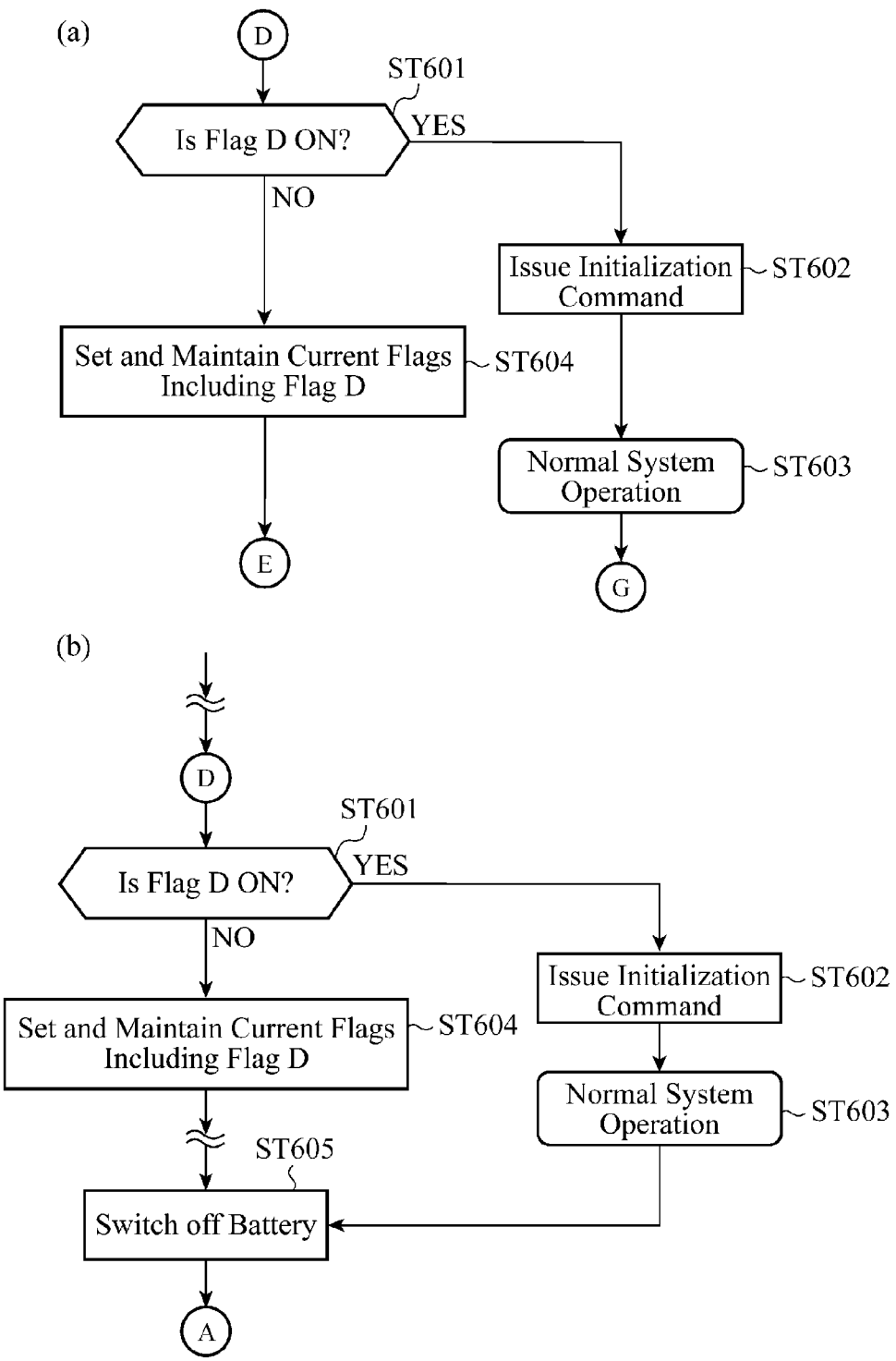
FIG. 6 is a flowchart showing the operation of case (4) of the onboard system of the embodiment 1 in accordance with the present invention.

Incidentally, if the flag C is set in the OFF state ("NO" at step ST501) in the flag C deciding processing at step ST501, and if the VIN which is the vehicle information is received ("YES" at step ST505), or if the VIN has not yet received ("NO" at step ST505), followed by setting the flag C in the ON state by controlling the flag retaining unit 100 (step ST506), the flag update condition deciding unit 105 proceeds to (4) processing when the power supply is turned off before the system shutdown, which is shown by the flowchart D in FIG. 6(*a*) or 6(*b*).

In FIG. 6(*a*), the command issuing condition deciding unit 106 refers to the flag D in the flag retaining unit 100 (step ST601). As a result, if the flag D is set ON ("YES" at step ST601), the command issuing condition deciding unit 106 controls the command transmitting unit 107 to transmit the initialization command to the DVD drive 20 (step ST602), followed by making a transition to the normal system operation (step ST603). Incidentally, if the flag D is set OFF in the flag D deciding processing at step ST601 ("NO" at step ST601), the flag update condition deciding unit 105 maintains the current flag settings including the flag D in the flag retaining unit 100 (step ST604).

FIG. 6(*b*) shows a case where the flag D is switched ON at the system start. More specifically, when the internal state monitoring unit 104 detects that the power supply (battery) is switched off before the system shutdown in which the value of the flag D in the flag retaining unit 100 is updated by the flag update condition deciding unit 105 (step ST605), the head unit 1 proceeds to (1) processing at the initial start after the assembly of the DVD drive 20, which is shown by the flowchart A in FIG. 3. Here, the command issuing condition deciding unit 106 refers to the flag A in the flag retaining unit 100 (step ST302). As a result, if the flag A indicates ON ("YES" at step ST302), the command issuing condition deciding unit 106 controls the command transmitting unit 107 to transmit the initialization command to the DVD drive 20 (step ST303).

Figure 7:
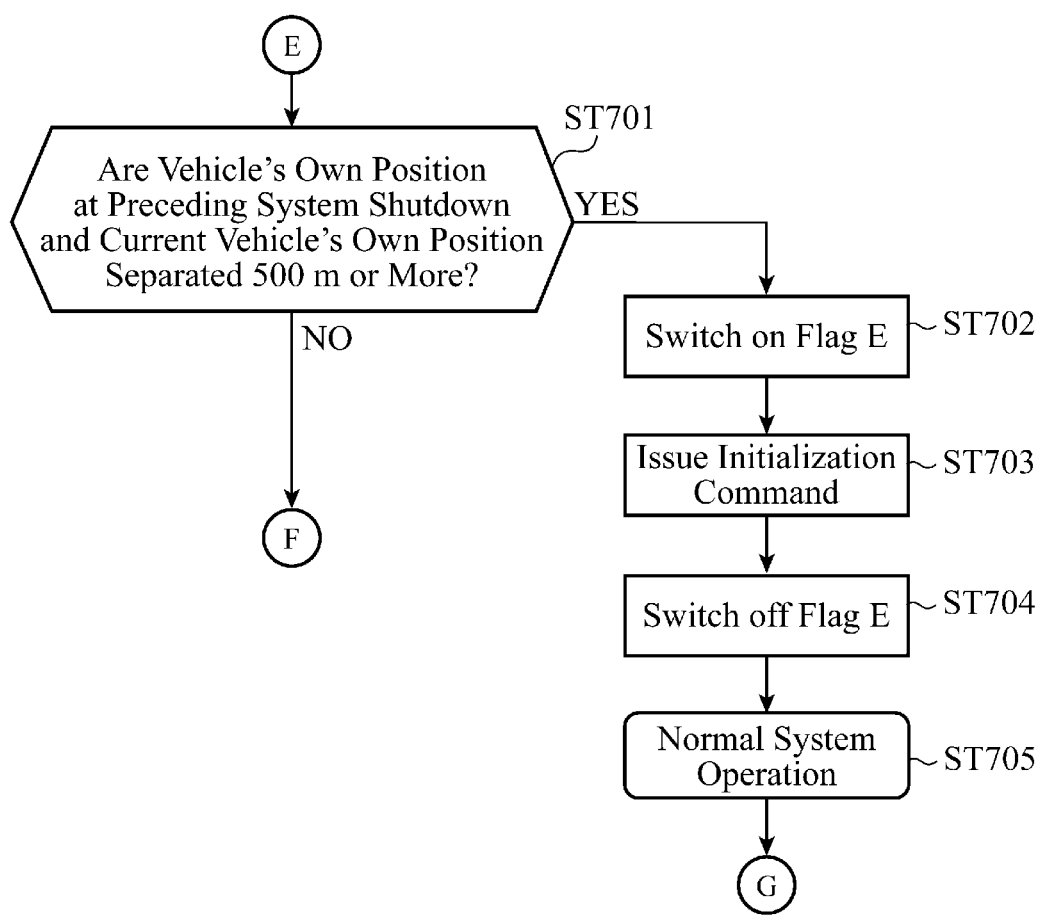
FIG. 7 is a flowchart showing the operation of case (5) of the onboard system of the embodiment 1 in accordance with the present invention.

Incidentally, after holding the current flag settings including the flag D in the flag retaining unit 100 at step ST604 of FIG. 6(a), the head unit 1 executes (5) processing when the vehicle position varies in the inactive state, which is shown by the flowchart E in FIG. 7.

Here, according to the current position information on the vehicle acquired by the position information acquiring unit 101, the internal state monitoring unit 104 compares the vehicle's own position before the preceding system shutdown with the vehicle's own position at the start this time (step ST701). As a result of the comparison, if the internal state monitoring unit 104 decides that the vehicle has moved a prescribed distance (500 m, for example) or more ("YES" at step ST701), it sets the flag E to the ON state by controlling the flag retaining unit 100 (step ST702).

Subsequently, the internal state monitoring unit 104 switches its control to the command issuing condition deciding unit 106. The command issuing condition deciding unit 106 controls the command transmitting unit 107 to transmit the initialization command to the DVD drive 20 (step ST703).

In this case, the flag update condition deciding unit 105 controls the flag retaining unit 100 to switch the flag E to the OFF state which is the default value (step ST704). After that, the head unit 1 makes a transition to the normal system operation (step ST705), followed by executing the "system shutdown processing" which is shown by the flowchart G in FIG. 9.

Figure 8:
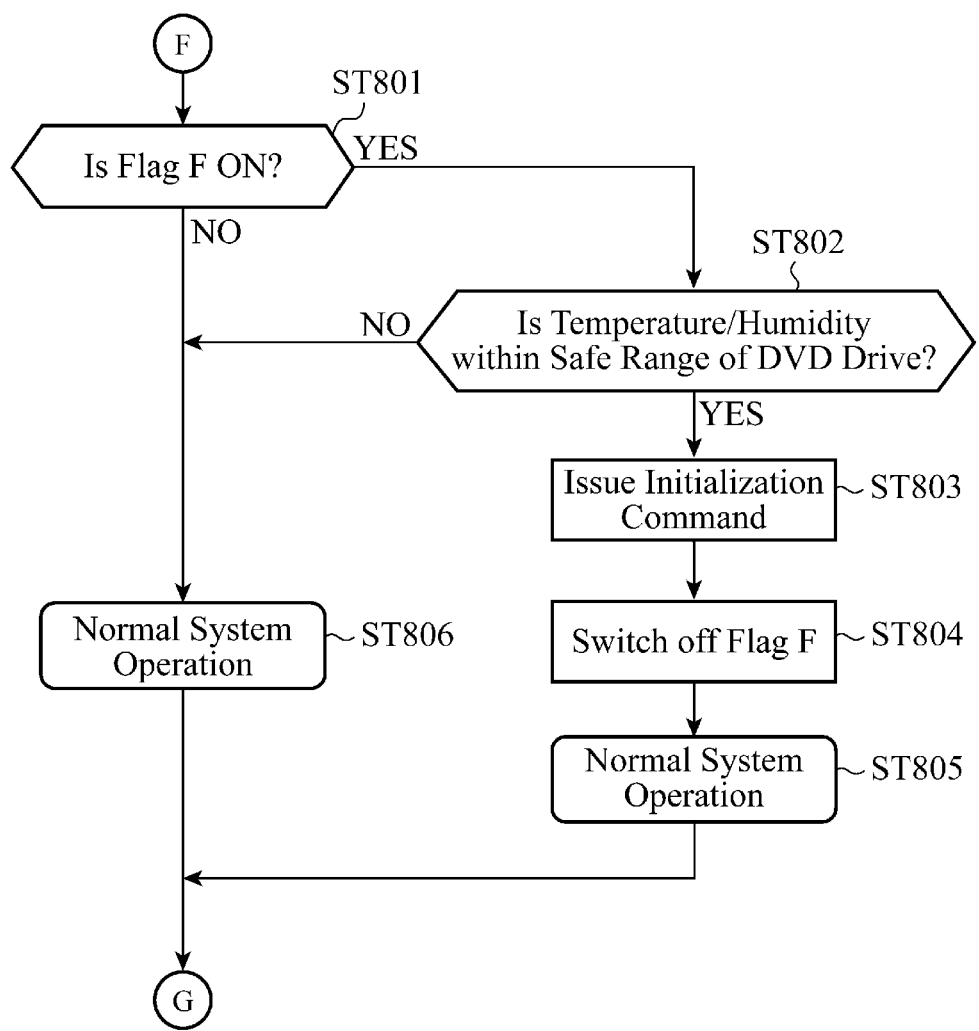
FIG. 8 is a flowchart showing the operation of case (6) of the onboard system of the embodiment 1 in accordance with the present invention.
Figure 9:
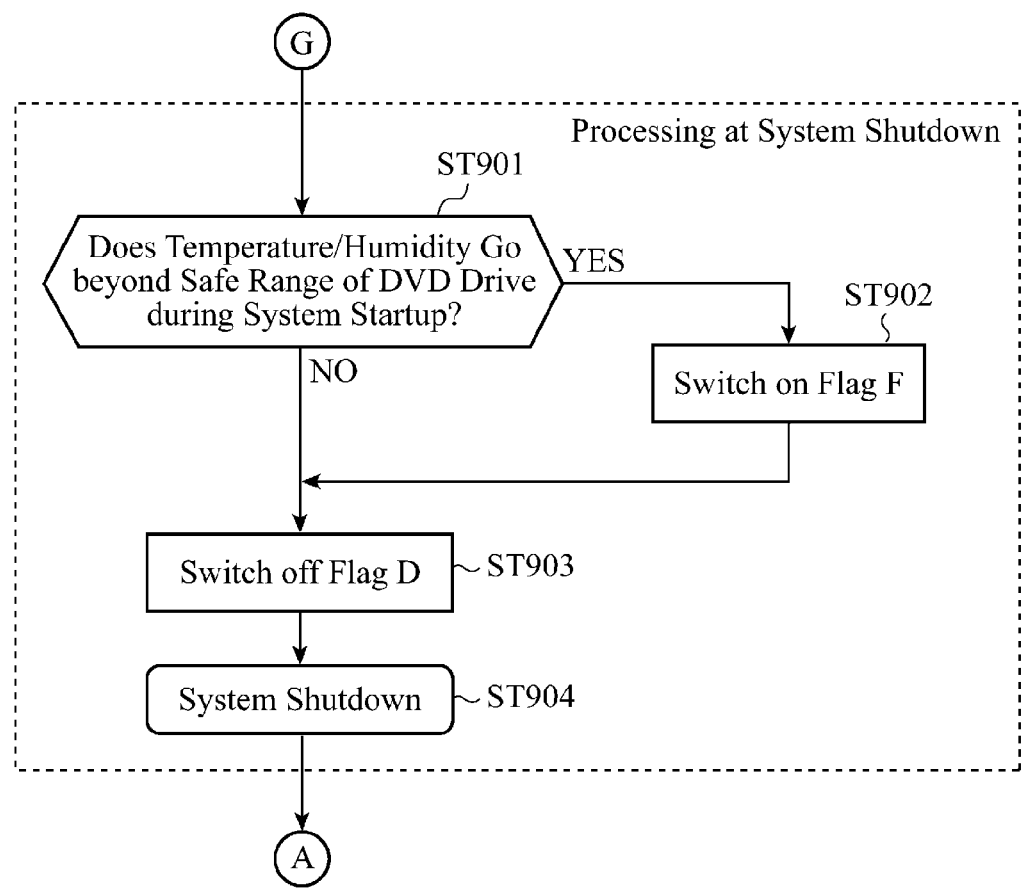
FIG. 9 is a flowchart showing the operation of system shutdown processing of the embodiment 1 in accordance with the present invention.

On the other hand, unless the vehicle position comparing processing at step ST701 makes a decision that the vehicle has moved the prescribed distance or more ("NO" at step ST701), the head unit 1 executes (6) processing when the temperature or humidity goes beyond the safe operation range of the DVD drive 20, which is shown by the flowchart F in FIG. 8.

More specifically, the head unit 1 refers to the flag F first (step ST801), and if the flag F is set ON ("YES" at step ST801), it has the internal state monitoring unit 104 make a decision as to whether the information about the ambient temperature or humidity acquired by the temperature (humidity) information acquiring unit 102 is within the safe range of the DVD drive 20 or not (step ST802).

Here, if it decides that it is within the safe operation range ("YES" at step ST802), the internal state monitoring unit 104 moves its control to the command issuing condition deciding unit 106. The command issuing condition deciding unit 106 controls the command transmitting unit 107 to transmit the initialization command to the DVD drive 20 (step ST803). In this case, the flag update condition deciding unit 105 controls the flag retaining unit 100 to return the flag F to the OFF state which is the default value (step ST804). Then, the head unit 1 makes a transition to the normal system operation (step ST805), followed by making a transition to the execution of the system shutdown processing (G).

Incidentally, if the flag F is in the OFF state in the ON deciding processing of the flag F at step ST801 ("NO" at step ST801), or if the within-safe-range operation deciding processing at step ST802 decides that the information about the ambient temperature or humidity goes beyond the safe range of the DVD drive 20 ("NO" at step ST802), the head unit 1 makes a transition to the normal system operation (step ST806), followed by making a transition to the execution of the system shutdown processing (G).

In the system shutdown processing executed here, even if the information about the ambient temperature or humidity acquired by the temperature (humidity) information acquiring unit 102 has once become a value that will have an influence on the safe range of the DVD drive 20, recovery thereof is waited for ("YES" step ST901), in which case the flag update condition deciding unit 105 executes the processing of bringing the flag F to the ON state by controlling the flag retaining unit 100 (step ST902). Incidentally, in the case of operation in the safe range ("NO" at step ST901), the flag update condition deciding unit 105 controls the flag retaining unit 100 to execute the processing to return the flag D which has been switched ON at the system start to the OFF state which is the default value (step ST903), followed by making the normal termination (step ST904).

As described above, according to the onboard system of the embodiment 1 in accordance with the present invention, the control unit (main CPU 10) refers to the flag A in the flag retaining unit 100 at the initial start after the assembly of the DVD drive 20 (case 1), and transmits the initialization command when the flag A shows the prescribed value; and refers to the flag B in the flag retaining unit 100 at the initial start after mounting the DVD drive 20 in the vehicle (case 2), and transmits the initialization command when the flag B shows the prescribed value and when the vehicle information (VIN) is received, thereby executing the initialization of the working parts of the DVD drive 20. In addition, along with the execution of the initialization command, updating the values of the flags A and B to return them to the default value makes it possible to suppress the initialization operation at the normal start. This will make it possible to reduce the occurrence frequency of the mechanical sound greatly. Accordingly, occasions that will give a user a feeling of displeasure or a sense of discomfort owing to the mechanical sound can be reduced to a minimum necessary.

In addition, when the head unit 1 is once removed from the vehicle, started outside the vehicle and then mounted again in the vehicle (case 3), the control unit (main CPU 10) transmits, when it receives the vehicle information such as the VIN and when the flag C indicates the prescribed value, the initialization command to the DVD drive 20, thereby being able to execute the initialization operation of the working parts of the DVD drive 20. Furthermore, along with the execution of the initialization command, the control unit (main CPU 10) updates the value of the flag C to return to the default value, thereby being able to suppress the initialization operation at the normal start. This will be able to reduce the occurrence frequency of the mechanical sound greatly. Accordingly, occasions that will give a user a feeling of displeasure or a sense of discomfort owing to the mechanical sound can be reduced to a minimum necessary.

In addition, if detecting switching off of the power supply before the shutdown in which the value of the flag D in the flag retaining unit 100 is updated (case 4), the control unit (main CPU 10) transmits, if the flag D indicates the prescribed value, the initialization command, thereby being able to execute the initialization operation of the working parts of the DVD drive 20. Furthermore, along with the execution of the initialization command, the control unit (main CPU 10) updates the value of the flag D, thereby being able to suppress the initialization operation at the normal start. This will make it possible to reduce the occurrence frequency of the mechanical sound greatly. Accordingly, occasions that will give a user a feeling of displeasure or a sense of discomfort owing to the mechanical sound can be reduced to a minimum necessary.

In addition, when a decision is made at a start that the vehicle has moved the prescribed distance or more by comparing the vehicle's own position before the preceding shutdown with the vehicle's own position at the start this time (case 5), the control unit (main CPU 10) sets the prescribed value in the flag E. Thus, at the initial start after the movement, it can execute the initialization operation of the working parts of the DVD drive 20 by transmitting the initialization command when the flag E indicates the prescribed value in the inactive state of the head unit 1.

Furthermore, when at least one of the ambient temperature and humidity goes beyond the operation allowable range during the normal operation (case 6), the control unit (main CPU 10) sets the prescribed value in the flag F in the flag retaining unit 100. Thus, at the initial start after detecting this state, if the recovery of the state is informed from the temperature (humidity) sensor 5 and if the flag F indicates the prescribed value, the control unit transmits the initialization command, thereby executing the initialization of the working parts of the DVD drive 20. Furthermore, along with the execution of the initialization command, the control unit updates the value of the flag F and returns it to the default value, thereby being able to suppress the initialization operation at the normal start. This will make it possible to reduce the occurrence frequency of the mechanical sound greatly. Accordingly, occasions that will give a user a feeling of displeasure or a sense of discomfort owing to the mechanical sound can be reduced to a minimum necessary.

Incidentally, in the cases (1)-(6) described above, although not shown in each flowchart, the flag update condition deciding unit 105 carries out, at the initial start after the reset processing, the control of returning the value indicated by at least one of the flag C-flag F to the default value before the update. This will make it possible to suppress the initialization operation at the normal start, and to reduce the occurrence frequency of the mechanical sound greatly. Accordingly, occasions that will give a user a feeling of displeasure or a sense of discomfort owing to the mechanical sound can be reduced to a minimum necessary.

Incidentally, according to the foregoing onboard system of the embodiment 1 in accordance with the present invention, although the system using the DVD drive 20 as the portable storage device is described, it is not only applicable to a CD (Compact Disc) drive, MD (Mini Disc) drive, MO (Magneto Optical) drive, or hard disk drive, but also to all the portable storage device having the working parts for driving a recording medium including a semiconductor memory.

In addition, according to the onboard system of the embodiment 1, although it is supposed to acquire the VIN from the external equipment ECUs 2 as the vehicle information, it is not limited to the VIN. For example, it can be replaced by the vehicle information such as vehicle speed information or steering angle information obtained via the ECUs 2 as well.

Incidentally, as for the functions of the main CPU 10 (control unit) shown in FIG. 2, they can be implemented by software in their entirety, or at least part of them can be achieved by hardware.

For example, as for the data processing executed by the control unit which makes a decision at an initial start after assembly of the portable storage device (DVD drive 20) as to whether an issuing condition of the initialization command set and stored in the storage unit is satisfied, and transmits, when satisfied, the initialization command to the portable storage device, and which makes a decision at an initial start after mounting it in the vehicle as to whether an issuing condition of the initialization command set and stored in the storage unit is satisfied, and transmits, when satisfied, the initialization command to the portable storage device, it can be achieved by one or more programs on a computer, or at least part of it can be implemented by hardware.

INDUSTRIAL APPLICABILITY

As described above, to avoid giving a user a feeling of displeasure or a sense of discomfort by suppressing the occurrence of the mechanical sound by limiting the occasion of carrying out the initialization operation as much as possible, an onboard system in accordance with the present invention is configured in such a manner that it includes onboard information equipment in which a portable storage device is mounted and external equipment connected to the onboard information equipment via a serial communication channel, the onboard system comprising: a storage unit for setting and storing issuing conditions of an initialization command for position adjustment of a working part of the portable storage device; and a control unit for making a decision at an initial start after assembly of the portable storage device as to whether an issuing condition of the initialization command set and stored in the storage unit is satisfied and for transmitting, when satisfied, the initialization command to the portable storage device, and for making a decision at an initial start after mounting it in the vehicle as to whether an issuing condition of the initialization command set and stored in the storage unit is satisfied and for transmitting, when satisfied, the initialization command to the portable storage device. Accordingly, it is suitable for an application not only to a navigation system, but also to an onboard system such as onboard information equipment for processing various video and audio information.

What is claimed is:

1. An onboard system for a vehicle, comprising:
   a portable storage device that receives an initialization command, and performs an initialization operation for adjusting a position of a mechanical unit of the portable storage device to a default position in response to said initialization command;
   a storage unit that stores a plurality of flags associated with different conditions for issuing said initialization command to the portable storage device, each of the flags being set to have a value indicating whether or not to issue the initialization command to the portable storage device; and
   a control unit that analyzes vehicle state information in combination with the values of the plurality of flags, said vehicle state information determinative of which of the plurality of flags is effective to cause the initialization command to be issued, and issues the initialization command to the portable storage device when the effective flag has a value indicating issuance of the initialization command, and, when finishing issuing the initialization command, updates said effective flag to have a value indicating a prohibition of issuing the initialization command.

2. The onboard system according to claim 1, further comprising external equipment connected through an onboard network with onboard information equipment in which the portable storage device is equipped,
   wherein the plurality of flags include a first flag associated with one of the different conditions indicating an initial start of the portable storage device after assembling said portable storage device, and a second flag associated with another one of the different conditions indicating an initial start of the portable storage device after mounting said portable storage device in the vehicle, and wherein the control unit issues the initialization command to the portable storage device, when the first flag has the value indicating the prohibition of issuing the initialization command and the second flag has the value indicating the issuance of the initialization command simultaneously when receiving vehicle information transmitted from the external equipment.

3. The onboard system according to claim 2, wherein the plurality of flags include a third flag, and the control unit controls the third flag to have the value indicating the issuance of the initialization command, when the both first and second flags have the value indicating the prohibition of issuing the initialization command simultaneously when the vehicle information transmitted from the external equipment cannot be received.

4. The onboard system according to claim 3, wherein the plurality of flags include a fourth flag to which the value indicating the issuance of the initialization command is to be set at a start of the onboard system, and the control unit determines whether to issue the initialization command to the portable storage device in accordance with the first flag, when the onboard system is restarted after detecting switching off of a power supply before completing update of the value of the fourth flag.

5. The onboard system according to claim 4, wherein the plurality of flags include a fifth flag, and the control unit compares a current position with a previous position with respect to the vehicle when the onboard system is started and simultaneously when the first to fourth flags have the values indicating the prohibition of issuing the initialization command, the previous position being detected just before a latest shutdown of the onboard system, and controls the fifth flag to have the value indicating the issuance of the initialization command when a distance between the compared positions indicates more than a prescribed distance.

6. The onboard system according to claim 5, further comprising a sensor that detects at least one of temperature and humidity around the onboard system, wherein the plurality of flags include a sixth flag, and the control unit recognizes a value detected by the sensor when the sixth flag has the value indicating the issuance of the initialized command, and issues the initialization command to the portal storage device when the recognized value is within an allowable range of the portable storage device.

7. The onboard system according to claim 1, wherein the control unit controls, at an initial start after reset processing, a value at least one of the plurality of flags to have a default value.

8. The onboard system according to claim 1, wherein the portable storage device is a drive device for Digital Versatile Disc (DVD) or for Compact Disc (CD).

9. The onboard system according to claim 8, wherein the mechanical unit of the portable storage device includes a mechanical part controlled by a servomotor system of the drive device.

* * * * *